Aug. 15, 1933.                J. IMSCHWEILER                1,922,734
                                TRAP NEST FRONT
                              Filed Sept. 2, 1931
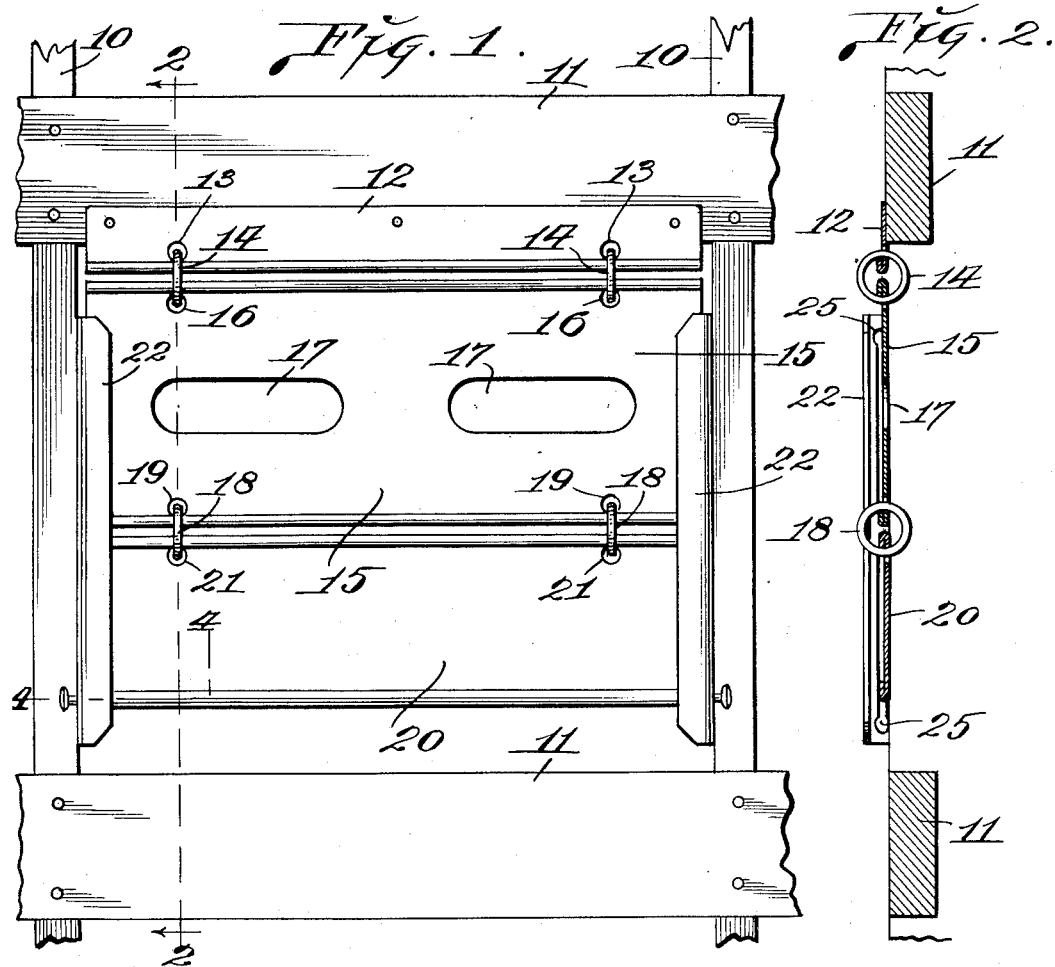
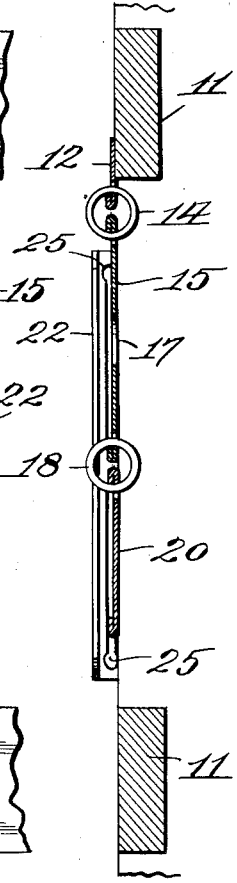
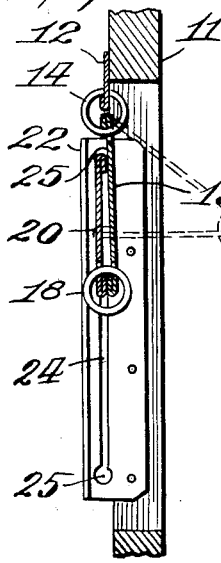
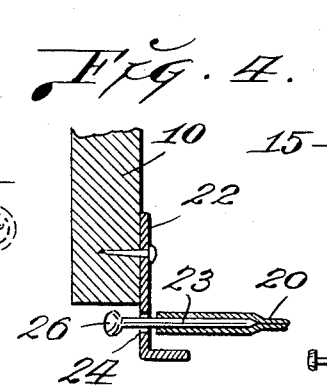
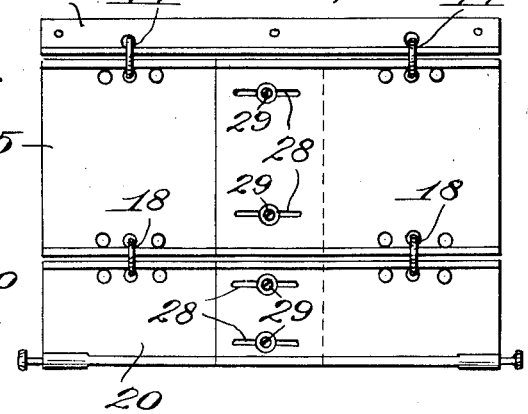
INVENTOR:—
JOHN IMSCHWEILER:
BY Martin P. Smith ATTS.

Patented Aug. 15, 1933

1,922,734

UNITED STATES PATENT OFFICE 1,922,734

TRAP NEST FRONT

John Imschweiler, Inglewood, Calif.

Application September 2, 1931. Serial No. 560,748

3 Claims. (Cl. 119—49)

My invention relates to a trap nest front and has for its principal objects, the provision of a relatively simple, practical and inexpensive structure that functions as a front for trap nests and which structure when released by the fowl entering the nest, automatically acts through gravity to move into position to close the front of the nest, thereby trapping the fowl therein so as to enable the poultryman to accurately check the results of the individual fowls of his flock and further, to provide a trap nest front that is strong and durable in construction and which may be conveniently manipulated when set for use.

A further object of my invention is, to provide a trap nest front that may be readily adjusted in width so as to permit of its being used with nests of varying widths and consequently eliminating the necessity for the manufacture of a number of fronts of different lengths.

With the foregoing and other objects in view, my invention consists in certain novel features of construction and arrangement of parts that will hereinafter be more fully described and claimed and illustrated in the accompanying drawing in which:

Fig. 1 is a front elevational view of a trap nest and showing my improved front applied thereto.

Fig. 2 is a vertical section taken on the line 2—2 of Fig. 1.

Fig. 3 is a vertical section similar to Fig. 2 and showing the front in its open set position.

Fig. 4 is an enlarged horizontal section taken on the line 4—4 of Fig. 1.

Fig. 5 is a front elevational view of the form of trap nest front that is capable of being adjusted in width.

Referring by numerals to the accompanying drawing which illustrates a practical embodiment of my invention, 10—10 designate the upright members that form the side walls of the nest boxes and arranged on the front edges of these upright members are horizontally disposed rails 11 which, together with the upright members 10, define the rectangular opening into the box or chamber that is occupied by the nest.

Secured in any suitable manner to the lower front face of the rail 11 that is disposed above the nest opening, is a horizontally disposed metal strip 12, the lower portion of which projects below the edge of the rail 11 and formed in this lower portion of the strip adjacent to its ends are apertures 13. The lower edge of the strip 12 is folded double or beaded to provide a smooth finished edge.

Suspended from the strip 12, by means of rings 14, which pass through the apertures 13, is the upper plate or member 15 of the nest door which member is preferably formed of sheet metal with its upper and lower edges folded double or beaded so as to provide smooth finished edges.

The rings 14, by means of which this member 15 is suspended, pass through apertures 16 that are formed in the upper portion of the member just below the finished upper edge thereof.

The length of member 15 is slightly less than the width of the nest opening between the upright members 10.

Formed in the intermediate portion of upper nest front member 15 are two or more openings 17, which may be of any size and shape desired and which provide ventilation for the nest, as well as serving as openings to enable an attendant to observe the interior of the nest chamber when the door is closed.

Suspended from the lower edge of upper nest front member 15, by means of metal rings 18 that pass through apertures 19, that are formed in the lower portion of said member 15, is the lower nest front member 20 and this lower member is preferably formed of sheet metal and substantially equal in width to the width of member 15.

The rings 18, from which this lower member is suspended, pass through apertures 21, that are formed in the upper portion of said member 20.

The height of the lower member 20 is somewhat less than the height of member 15 and when the front is in position to close the nest chamber, the lower edge of said lower member 20 occupies a horizontal plane a short distance above the upper edge of the rail 11 that is disposed below the nest opening.

The upper and lower edges of lower member 20 are folded double or beaded so as to provide smooth finished edges.

Secured in any suitable manner to the faces of the upright members 10 at the sides of the nest opening, are the inwardly presented flanges of vertically disposed angle strips 22, that are preferably formed of sheet metal and the outer flanges of these angle strips which project toward each other, occupy vertical positions directly in front of the ends of the nest front members 15 and 20.

Projecting outwardly from the lower portions of the ends of lower nest front member are guide members 23, such as wire nails and the projecting portions of these guide members extend through vertically disposed slots 24 that are formed in the outer portions of the inwardly projecting flanges of the angle strips 22.

One or both ends of each slot 24 may be enlarged, as designated by 25, in order to accommodate the head 26 on the outer end of the guide member 23 thereby shaping the parts of the structure to be readily assembled or taken apart.

The relative sizes of the rings 14, apertures 13 and 16, rings 18 and apertures 19 and 21 and the guide members 24 and slots 23 is such that the parts of the nest front will swing and move freely during operation and without undue friction or binding.

To open the nest front and set the same so that it will automatically close by gravity when engaged by the back or tail of the fowl while entering the nest, the upper front member 15 is swung inwardly so as to occupy an inclined position, as illustrated by dotted lines in Fig. 3, and such movement necessarily raises the lower member 20.

The operator's fingers engage beneath the lower edge of member 20 and the latter is forced upward during which time the guide members 23 traverse the slot 24 and as the upper portion of member 20 is loosely connected to the lower edge of upper member 15, said member 20 will be inverted or turned upside down and will finally be positioned in front of the lower portion of member 15, as illustrated by solid lines in Fig. 3, thereby leaving sufficient space below the members 15 and 20 for the hen to enter the nest.

As the fowl enters the nest its back or tail will engage against the lower edges of members 15 and 20, thereby swinging same inwardly and as such action occurs the guide members 23 projecting from the ends of member 20 will ride downwardly through the slots 24 and after said guide members pass below the horizontal plane occupied by the lower edge of member 15, the lower member 20 will swing downward by gravity into a vertical position directly below upper member 15 so as to close the front of the trap of the nest and trap the fowl therein.

During the opening and closing movements of the nest front, the lower edge of the lower member 20 is guided by the pins or members 23 that traverse the slots 24.

In Fig. 5, I have shown a form of neat front that may be adjusted in width so as to be applied to nest openings or chambers of different widths and where such construction is employed, the upper and lower members of the nest front are each made in two parts with the inner portions of said parts overlapping each other. Formed in one overlapping part are one or more horizontally disposed slots 27 and passing therethrough and seated in the other part are screws 29 which, when tightened secures the two parts to each other in their adjusted position.

Where this adjustable construction is employed, the upper edge of the lower front member and both upper and lower edges of the upper and lower front members are provided with a plurality of apertures for the accommodation of the rings 14 and 18.

Thus it will be seen that I have provided a trap nest front that is relatively simply in construction, inexpensive of manufacture and very effective in performing the functions for which it is intended.

The entire front is constructed of metal and is therefore vermin-proof and the two-part front structure provided with ventilation and observation openings in the upper member may be conveniently manipulated when shifted into cocked or set position.

It will be understood that minor changes in the size, form and construction of the various parts of my improved trap nest front may be made and substituted for those herein shown and described without departing from the spirit of my invention, the scope of which is set forth in the appended claims.

I claim as my invention:

1. In a trap nest front, a frame comprising an upper member, a lower member and a pair of upright side members, a rail secured to the lower portion of said upper frame member, an upper member, a lower member, hinges connecting the upper portion of the upper member with said rail, hinges connecting the lower portion of said upper member with the upper portion of said lower member, vertically disposed members secured to the upright side members of the frame at the ends of said trap nest front members, said vertically disposed members provided with slots, guiding members projecting from the lower portions of the ends of the lower trap nest front member and projecting through said slots, heads on the outer ends of said guiding members and both ends of the slots in said vertically disposed members being enlarged for the accommodation of said heads when the parts of the trap nest front are assembed or taken apart.

2. The combination with a trap nest frame, of a folding front for closing the opening in said frame, said front comprising an upper member, hinges connecting the upper portion of said upper member to the upper part of the frame, said upper member being provided with a relatively narrow opening, a lower front member, hinges between the lower portion of the upper front member and the upper portion of the lower front member, vertically disposed slotted guides on the upright side members of the frame, guiding members projecting from the lower corners of the lower front member through the slots in said upright members, heads formed on the outer ends of said guiding members and both ends of the slots in said guides being enlarged for the accommodation of the heads on said guiding members while the trap nest front is being assembled or taken apart.

3. A trap nest front, comprising a top plate, an upper front member, hinges connecting the upper portion of said upper front member and said top plate, said upper front member being provided with an opening, a lower front member, hinges connecting the upper portion of said lower front member and the lower portion of said upper front member, vertically disposed fixed slotted guides arranged at the ends of said front member, pins projecting from the lower portions of the ends of the lower front member through the slots in said guides, heads on the outer ends of said pins, the upper ends of the slots in said guides being enlarged for the accommodation of the heads on said pins when the parts of the trap nest front are assembled or taken apart and a frame surrounding the trap nest front, said top plate and said slotted guides being secured respectively to the upper and side members of said frame.

JOHN IMSCHWEILER.